United States Patent [19]

Channell et al.

[11] 4,021,362

[45] May 3, 1977

[54] GAS GENERATING SYSTEM FOR CHEMICAL LASERS

[75] Inventors: Ronald E. Channell, Colorado Springs, Colo.; John E. O'Pray, Albuquerque, N. Mex.

[73] Assignee: The United States of America as represented by the Secretary of the Air Force, Washington, D.C.

[22] Filed: July 1, 1975

[21] Appl. No.: 592,297

Related U.S. Application Data

[63] Continuation-in-part of Ser. No. 537,690, Dec. 30, 1974, abandoned.

[52] U.S. Cl. .................... 252/188; 252/188.3 R; 423/646; 423/648 A; 423/656
[51] Int. Cl.² .................... C01B 4/00; C01B 1/05
[58] Field of Search .................... 252/188, 188.3 R; 423/646, 648, 651, 656, 658

[56] References Cited

UNITED STATES PATENTS

| | | | |
|---|---|---|---|
| 2,739,929 | 3/1956 | Madinger | 423/658 |
| 3,726,966 | 4/1973 | Johnson | 423/658 |
| 3,862,052 | 1/1975 | Beckert et al. | 252/188 |
| 3,864,465 | 2/1975 | Hoffert | 423/658 |

*Primary Examiner*—Benjamin R. Padgett
*Assistant Examiner*—Irwin Gluck
*Attorney, Agent, or Firm*—Joseph E. Rusz; William J. O'Brien

[57] ABSTRACT

A gas generating solid composition adapted to provide gaseous reactants to a chemical laser which comprises a mixture of (a) lithium aluminum deuteride or hydride, (b) deuteroammonium chloride or ammonium chloride, (c) iron oxide, and (d) a polymeric binder.

2 Claims, No Drawings

GAS GENERATING SYSTEM FOR CHEMICAL LASERS

STATEMENT OF GOVERNMENT INTEREST

The invention described herein may be manufactured and used by or for the Government for governmental purposes without the payment of any royalty thereon.

BACKGROUND OF THE INVENTION

This application is a continuation-in-part of Ser. No. 537,490, filed on Dec. 30, 1974, now abandoned.

This invention relates to chemical lasers and, more particularly, to a gas generating system for use therewith. Laser systems that generate a lasing action through the medium of a chemical reaction are well known. In these systems, the chemically motivated lasing action is brought about by a technique which involves diffusing a first reactant gas, such as hydrogen or deuterium, into a supersonic jet flow containing a second reactant gas, such as fluorine. The two gases react chemically to provide a sustained high speed flow of vibrationally excited gaseous product with the necessary population inversion and lifetime needed to create a lasing action. The vibrationally excited gas flows into an optical laser cavity where the lasing action takes place.

Chemical lasers have proven to be useful for a number of applications. However, their use in various airborne applications has been severely limited heretofore because of the complexities involved in supplying gaseous reactants from a liquid source. Problems of storage, maintenance, and delivery which are prevalent when using liquid mediums as a source of gas have hindered the utilization of chemical lasers for military airborne laser applications.

With the present invention, however, it has been found that the utilization of a solid propellant gas generating composition having a particular compositional content overcomes the problems associated with liquid gas generating mediums. The gas generating formulation of this invention provides a stable, storable and simple source of deuterium or hydrogen for use in airborne chemical laser systems. The invention demonstrates the unique feature of matching the gas yield per unit volume of cryogenic deuterium or hydrogen and, in addition, eliminates the complexities associated with maintaining and manipulating cryogenic systems and the weight and volume penalties associated with compressed gas reactant storage systems.

SUMMARY OF THE INVENTION

The present invention concerns itself with a laser gas generating system which utilizes the combustion of a solid formulation to supply the deuterium or hydrogen required by a chemical laser coupled to the gas generator. This gas generator is a solid formulation which, when ignited, produces molecular deuterium or hydrogen as the primary product during self-sustaining combustion. The formulation for the gas generator consists of powdered lithium aluminum deuteride or hydride, deuteroammonium chloride or ammonium chloride, iron oxide, and a polymeric binder. The powders are intimately mixed and then pressed into a cohesive solid composition. The only gaseous combustion product of this formulation is high purity deuterium or hydrogen. All of the other combustion products are solids and are retained as a cohesive sintered "clinker". An examination of the gaseous combustion products has verified that 99.5 percent hydrogen isotropic purity can be achieved. Lasing has been demonstrated with hydrogen fluoride (HF) subsonic flow chemical laser and with deuterium generators coupled to a supersonic flow laser operated in both the deuterium fluoride-carbon dioxide ($DF-CO_2$) transfer chemical laser mode and the DF direct chemical laser mode.

Accordingly, the primary object of this invention is to provide a solid formulation capable of supplying gaseous reaction products to a chemical laser.

Another object of this invention is to provide a solid formulation which, when ignited, produces molecular deuterium or hydrogen as the primary product during self-sustaining combustion.

Still another object of this invention is to provide a solid formulation for use in producing deuterium or hydrogen as a gaseous reactant for chemical lasers.

A further object of this invention is to provide a simple, storage source of deuterium or hydrogen for use in airborne applications of chemical lasers.

The above and still further objects and advantages of the present invention will become more readily apparent upon consideration of the following detailed description thereof.

DESCRIPTION OF THE PREFERRED EMBODIMENTS

Pursuant to the above-identified objects, this invention concerns itself with the formulation of a solid composition capable of supplying molecular deuterium or hydrogen gaseous reactants to a chemical laser. The composition comprises a powdered mixture composed of about 60 to 70 percent by weight of lithium aluminum deuteride or hydride, about 20 to 30 percent by weight of deuteroammonium chloride or ammonium chloride, and about 5 to 15 percent by weight of iron oxide added as a catalyst.

For increased structural integrity in larger gas generator grains about 3 to 4 percent by weight of hydrocarbon polymer binder is added.

The preparation of the deuterium or hydrogen generator formulation of this invention is very straightforward. The crystalline ingredients are first ground separately to a fine powder in a dry nitrogen atmosphere. All of the hydrides presented in this disclosure are very reactive with moisture, and thus must be handled in a moisture free atmosphere at all times. Therefore, all formulation preparations are conducted in a nitrogen atmosphere dry box equipped with a drying train typically operating at a very low moisture level (minus seventy degrees centigrade frost point). The typical dry box nitrogen atmospheric conditions are a pressure of 13.3 psia and a temperature of approximately 25° centigrade. All formulation ingredients are seived separately to a particle size of less than ninety mesh. The quantity of each ingredient for the selected formulation is then weighed out separately. All of the ingredients are placed in an appropriate size bottle. The ingredients are mixed by attaching the bottle to a rotating device operated at approximately sixty rpm. Approximately thirty minutes to one hour mixing time is required. A binder solution is prepared by dissolving 32 grams of Shell Kraton binder and 8 grams of optional Conco oil plasticizer in 400 milliliters of toluene which had been previously dried with calcium hydride and distilled. The propellant formulation is prepared by mixing 100 grams of the propellant ingredients mixture with 43 milliliters of the binder solution in a one-pint Baker-Perkins Vertical Planetary Mixer. The formulation is mixed at ambient temperature and pressure for 30 minutes at 300 rpm. The toluene solvent is removed by vacuum over a period of one hour while continuing the mixing at 300 rpm. The dry propellant formulation is then removed from the mixer, placed in the gas generator case, and pressed at 2000 psi into a cohesive grain. Case diameters of from ⁻ inch to 1 ¾ inches and case lengths of from ½ inch to 3.0 inches have been employed. Ignition of the sample is readily achieved using a Nichrome hotwire technique in which an electrical current of sufficient magnitude to heat the Nichrome wire to the ignition temperature of the sample is passed through the wire which is in physical contact with the sample surface.

The theoretical behavior of the deuterium or hydrogen gas generator is also straightforward, and is demonstrated by the following general empirical reactions:

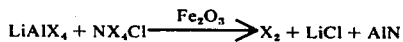

$$LiAlX_4 + NX_4Cl \xrightarrow{Fe_2O_3} X_2 + LiCl + AlN$$

wherein X = Deuterium or Hydrogen

The efficiency of deuterium or hydrogen production can be increased by adding an excess of lithium aluminum deuteride or hydride. The heat generated by the chemical reaction is used to thermally decompose the excess lithium aluminum deuteride or hydride into deuterium or hydrogen, lithium deuteride or hydride, and aluminum. The addition of excess lithium aluminum deuteride or hydride can also be used to control the combustion gas temperature.

Extensive theoretical equilibrium thermodynamic calaulations have been carried out in the hydrogen case for various excesses of lithium aluminum hydride. The calculations were performed using a Theoretical Specific Impulse Computer Program using standard thermodynamic data, including heats of formation of −28.0 Kcal/mole for lithium aluminum hydride, −75.18 Kcal/mole for ammonium chloride, and −197.3 Kcal/mole for ferric oxide. Predicted compositions for mole ratios of lithium aluminum hydride to ammonium chloride of 1:1 and 4:1 at 50 psia total pressures are given below in Table I.

TABLE I

| mole % — gases | 1:1 | 4:1 |
|---|---|---|
| LiCl | 2.6 | 0.0 |
| $Li_2Cl_2$ | 1.4 | 0.0 |
| $H_2$ | 94.4 | 100.0 |
| $N_2$ | 1.7 | 0.0 |
| T, °K | 1415 | 872 |

The combustion products composition was experimentally determined for the 4:1 ratio of lithium aluminum hydride to ammonium chloride and for the 3:1 ratio of lithium aluminum deuteride to deuteroammonium chloride. This analysis was conducted using a molecular beam type time-of-flight mass spectrometer which is capable of directly sampling the combustion products from a sample burning at atmospheric pressure. Experimental results are given below in Table II.

TABLE II

| Mole % — gases | 4:1 $LiAlH_4:NH_4Cl$ | 3:1 $LiAlD_4:ND_4Cl$ |
|---|---|---|
| $H_2$ | 99.5 | 0.4 |
| HD |  | 7.1 |
| $D_2$ |  | 92.1 |
| $N_2$ | 0.3 | 0.2 |
| $CM_4$ | 0.1 | 0.1 |
| CO | 0.1 | 0.2 |

The chemical laser mixing nozzle used for both the DF-$CO_2$ and DF lasing mode tests was a single two-dimensional converging-diverging "wedge" type supersonic nozzle. The nozzle entrance half angle was 45°, the throat gap was 0.040 inches, and the half angle of the supersonic expansion section was 15 degrees. The nozzle geometric expansion ratio was six, and the nozzle length was 4.0 inches. The deuterium or deuterium plus carbon dioxide flows were injected into the nozzle through a line of 40 holes of 0.013 inch diameter equally spaced along each side of the nozzle throat section. Fluorine was generated by precombustion of nitrogen trifluoride oxidizer with hydrogen fuel after mixing by a linear array of unlike impinging doublet injectors. Nitrogen diluent flowed into the precombustor around this injector array.

This low power chemical laser utilized a conventional stable optical resonator. The mirrors were mounted externally with the beam passing into the low pressure laser cavity region through barium fluoride optical windows inclined at Brewster's angle. The optical cavity length was 70 centimeters with a 98 percent reflective, one-inch diameter, gold coated mirror of 1.5 meter radius of curvature at one end and a 93 percent reflective germanium output coupler 2.0 inches in diameter with a 4.0 meter radius of curvature at the other end of the optical cavity. Laser power output was measured with a Coherent Radiation Model 201 Broadband Laser Power Meter mounted directly behind the output coupler. The centerline of the optical cavity was 0.21 inches downstream of the nozzle exit plane.

In a DF lasing demonstration, the precombustor gas flows in units of liters (S.T.P.) per minute were: 15.4 nitrogen trifluoride, and 16.9 hydrogen. Immediately after ignition of the deuterium generator grain, the laser output power rose to 5.3 Watts. The peak laser output power observed during this test was 7.0 Watts a deuterium flow rate of 31.2 liters per minute from the gas generator (63psia deuterium pressure at the deuterium sonic metering valve). The laser precombustor pressure was 3.2 psia and the optical cavity pressure was 2.4 Torr.

In light of the above, it can be seen that, for the first time, a lasing action has been demonstrated with deuterium and hydrogen gas generators utilizing solid formulations which were coupled to chemical lasers operating in the HF, DF, and DF-$CO_2$ lasing modes.

The invention solves the problem of supplying a stable storable, and simple source of deuterium or hydrogen for use in airborne chemical laser systems. This invention has the novel feature of matching the gas yield per unit volume of cryogenic deuterium or hydrogen and, in addition, eliminates the complexities associated with maintaining and manipulating cryogenic systems and the weight and volume penalties associated with compressed gas reactant storage systems. The essential novelty of this invention, however, is the application of deuterium or hydrogen gas generators using solid formulations for the production of pure gaseous deuterium or hydrogen for DF, HF, and DF-$CO_2$ chemical lasers as storable reactant sources.

The analysis of the combustion products of the compositions of this invention was conducted by employing standard gas mixtures composed of the product gases deuterium and hydrogen. The hydrogen isotopic purity of the combustion gases for the formulation which consisted of 60 percent by weight lithium aluminum deuteride, 27.5 percent by weight deuteroammonium chloride and 12.5 percent by weight iron oxide was 99.5 percent on a mole basis. The hydrogen isotopic composition for the deuterium gas generator was 97.5 percent deuterium and 2.5 percent hydrogen on an atom basis. The binder system is composed of The Shell Oil Company hydrocarbon polymer designated "Kraton" and the optional hydrocarbon plasticizer designated "Conco Oil" by the Continental Oil Company. Omission of the plasticizer does not significantly affect the structural integrity of the final pressed gas generator grains. This binder formulation was first tested for the purpose of determining if the binder caused any contamination of the exhaust gases. The hydrogen isotopic purity of the combustion gases for the formulation which consisted of 57.55 percent lithium aluminum deuteride, 26.38 percent deuteroammonium chloride, 11.99 percent iron oxide, 3.27 percent Kraton, and 0.82 percent Conco Oil by weight was 99.3 percent on a mole basis. The hydrogen isotopic composition for the deuterium gas generator was 96.6 percent deuterium and 3.4 percent hydrogen on an atom basis.

The hydrogen gas generator was also tested. The combustion characteristics of the hydrogen gas generator were essentially identical to those described previously for the deuterium gas generator as expected. The composition of the hydrogen gas generator formulation which yielded the best combustion characteristics and was the most efficient in hydrogen production consisted of 66.2 percent lithium aluminum hydride, 23.2 percent ammonium chloride and 10.9 percent iron oxide by weight. The hydrogen gas purity for this composition as analyzed in real time as the sample burned by employing the molecular beam time-of-flight mass spectrometer was 99.5 percent on a mole basis.

The operation of a chemical laser on hydrogen supplied from a solid source was also conducted. The hydrogen gas generator consisted of an end-burning solid formulation weighing approximately ten grams encased in a circular stainless steel case of 0.875 inch diameter with a total height of three inches. The samples were ignited by means of a nichrome hotwire technique. This hydrogen gas generator produced approximately five hundred cubic centimeters of pure hydrogen per second. The laser employed in this demonstration was a subsonic flow laser operated in the hydrogen fluoride direct chemical laser mode. An analysis of the laser output power for the tests conducted using the hydrogen gas generator indicated that laser performance was identical at equal hydrogen flow rates for tests conducted using bottled gaseous hydrogen or hydrogen produced by the hydrogen gas generator.

Lasing in the DF-$CO_2$ and DF transfer chemical laser modes utilizing deuterium supplied from a gas generating solid formulation was also demonstrated, by using a low power supersonic flow chemical laser. For the first DF-$CO_2$ lasing tests, the end burning gas generator grain was 0.875 inches in diameter and contained 7 grams of a formulation containing 3 moles of $LiAlD_4$ per mole of $ND_4Cl$. During the middle of the 25 second tests, the laser output power was 18 watts at a deuterium flow rate from the gas generator of 13 liters (S.T.P.) per minute. The lasing demonstration in the DF lasing mode used a gas generator grain of 1.5 inches in diameter which was formulated with 4 moles of $LiAlD_4$ per mole of $ND_4Cl$. A peak laser output power of 7.0 watts was observed at a deuterium flow rate of 31.2 liters (S.T.P.) per minute which was identical to the power observed at the same flow rate of deuterium supplied from a compressed gas cylinder.

From a consideration of the above, it can be seen that the present invention provides a novel system for providing gaseous deuterium or hydrogen reactants to a chemical laser. By eliminating the complexities of maintaining, storing and utilizing liquid ingredients as a source for gaseous reactants, this invention removes many of the problems associated with the use of chemical lasers for military airborne applications.

While the invention has been described with particularity in reference to specific embodiments thereof, it is to be understood that the disclosure of the present invention is for the purpose of illustration only and is not intended to limit the invention in any way, the scope of which is defined by the appended claims.

What is claimed is:

1. A solid composition of matter particularly adapted to provide gaseous reactants to a chemical laser comprising a compressed powder mixture composed of (a) about 60 to 70 percent by weight of lithium aluminum deuteride; (b) about 20 to 30 percent by weight of deuteroammonium chloride; (c) about 5 to 15 percent by weight of iron oxide and about 3 to 4 percent by weight of a hydrocarbon polymeric binder.

2. A composition of matter in accordance with claim 1 wherein said mixture is composed of about 60 percent by weight lithium aluminum deuteride, about 27.5 percent by weight of deuteroammonium chloride, about 12.5 percent by weight iron oxide, and about 4 percent by weight of a hydrocarbon polymeric binder.

* * * * *